US012761103B2

(12) United States Patent
Wetzig et al.

(10) Patent No.: US 12,761,103 B2
(45) Date of Patent: Oct. 13, 2026

(54) FILM CHAMBER COMPRISING A CARRIER GAS SUPPLY, AND METHOD FOR LEAK TESTING

(71) Applicant: INFICON GMBH, Cologne (DE)

(72) Inventors: Daniel Wetzig, Cologne (DE); Maximilian Reismann, Cologne (DE); Josef Grenz, Cologne (DE); Hendrik Van Triest, Cologne (DE)

(73) Assignee: INFICON GMBH, Cologne (DE)

( * ) Notice: Subject to any disclaimer, the term of this patent is extended or adjusted under 35 U.S.C. 154(b) by 350 days.

(21) Appl. No.: 18/270,524

(22) PCT Filed: Dec. 30, 2021

(86) PCT No.: PCT/EP2021/087829

§ 371 (c)(1),
(2) Date: Jun. 30, 2023

(87) PCT Pub. No.: WO2022/148701

PCT Pub. Date: Jul. 14, 2022

(65) Prior Publication Data

US 2024/0060848 A1 Feb. 22, 2024

(30) Foreign Application Priority Data

Jan. 7, 2021 (DE) ..................... 10 2021 100 147.1

(51) Int. Cl.
*G01M 3/20* (2006.01)

(52) U.S. Cl.
CPC .................................... *G01M 3/20* (2013.01)

(58) Field of Classification Search
CPC ................................ G01M 3/20; G01M 3/229
See application file for complete search history.

(56) References Cited

U.S. PATENT DOCUMENTS 6,354,142 B1 3/2002 Nothhelfer et al.
6,955,076 B1 * 10/2005 Widt ..................... G01M 3/229 73/49.3

(Continued)

FOREIGN PATENT DOCUMENTS

CN 1364232 A 8/2002
CN 107003204 A 8/2017

(Continued)

*Primary Examiner* — Alexander A Mercado
(74) *Attorney, Agent, or Firm* — Dickinson Wright PLLC

(57) ABSTRACT

The invention relates to a film chamber (10) for testing the sealing tightness of a test specimen containing a test fluid, the film chamber comprising: at least one vacuum connection (20) which can be connected to a vacuum pump (32) and a gas detector (36); at least one flexible wall region (14) that defines a film chamber volume; and a frame (12) that surrounds the flexible wall region (14) on the outside in order to seal the film chamber volume. The film chamber is characterized in that: the vacuum connection (20) is located in a region arranged centrally with respect to the frame (12) and is radially outwardly surrounded by the frame (12); and at least one gas inlet (22, 30) for supplying a carrier gas is located in the region of the outer frame in such a way that the carrier gas flows through the gas inlet through the film chamber volume along the flexible wall region (14) radially from the outside inwardly to the vacuum connection (20).

10 Claims, 3 Drawing Sheets

(56) References Cited

U.S. PATENT DOCUMENTS

| | | | | |
|---|---|---|---|---|
| 2003/0233866 | A1 * | 12/2003 | Widt | G01M 3/229 73/40 |
| 2014/0326051 | A1 * | 11/2014 | Wetzig | G01M 3/3281 73/40 |
| 2015/0241298 | A1 * | 8/2015 | Decker | G01M 3/3218 73/40 |
| 2017/0268957 | A1 * | 9/2017 | Wetzig | G01M 3/3218 |

FOREIGN PATENT DOCUMENTS

| | | | |
|---|---|---|---|
| CN | 110312920 | A | 10/2019 |
| CN | 111868495 | A | 10/2020 |
| DE | 19642099 | A1 | 4/1998 |
| DE | 198 46 800 | A1 | 4/2000 |
| DE | 10 2014 224 799 | A1 | 6/2016 |
| EP | 1 522 838 | B1 | 9/2010 |
| JP | H10185752 | A | 7/1998 |
| JP | 4488474 | B2 | 6/2010 |
| JP | 2017528725 | A | 9/2017 |
| JP | 6653703 | B2 | 2/2020 |
| WO | 2005096959 | A1 | 10/2005 |
| WO | 2016-087280 | A1 | 6/2016 |

* cited by examiner

FILM CHAMBER COMPRISING A CARRIER GAS SUPPLY, AND METHOD FOR LEAK TESTING

The invention relates to a film chamber for leak testing a test specimen containing a test fluid (test gas or test liquid).

Film chambers are used as test chambers for gas testing the gas tightness of a test specimen, such as a food package, for example. Here, the test specimen is filled with a test gas and is placed in the film chamber. The film chamber is closed and evacuated. Test gas escaping from the test specimen into the film chamber is detected by a gas detector. As an alternative to test gas detection, the increase in total pressure in the film chamber is measured. Thereby, a leak in the test specimen is detected independent of the type of test gas escaping from the test specimen.

With rigid test chambers, it is known to pass a continuous flow of a carrier gas different from the test gas through the test chamber in order to supply the test gas escaped from the test specimen to a detector together with the carrier gas.

Such a carrier gas method is described, for example, in EP 1 522 838 B1.

With test chambers having flexible walls or wall portions, so-called film chambers, it is also known to use a carrier gas, such as described in DE 10 2014 224 799 A1, for example.

In particular in the case of film chambers with flexible test chamber walls, it is difficult to generate a uniform carrier gas flow when the test chamber is an evacuated state and the walls of the film chamber have come to cling to the test specimen. In case of a non-uniform carrier gas flow distributed over the film surface, the leak rate signal is dependent on the position of the test specimen or the leak in the film chamber.

It is an object of the invention to provide an improved film chamber for leak testing a test specimen containing a test fluid according to the carrier gas method, as well as a corresponding method.

The film chamber according to the invention is defined by features disclosed herein.

The film chamber according to the invention comprises a vacuum port for connection to a vacuum pump and to a gas detector, through which port the gas is drawn from the inside of the film chamber. The film chamber comprises at least one flexible wall portion defining a film chamber volume. In particular, at least one wall of the film chamber may be designed to be completely flexible. Preferably, all film chamber walls are flexible. In this case, the film chamber may be formed by two flexible films placed against each other. A frame surrounding the flexible wall portion on the outside is provided for closing the film chamber volume. The frame may clamp the films and press them against each other. In particular, it is conceivable that each film wall has a frame of its own, wherein the frames of the film walls are pressed against each other in a gas-tight manner so as to close the film chamber volume.

It is the particularity of the invention that the vacuum port is arranged centrally with respect to the frame and is surrounded by the same on the outside, while at least one gas inlet for supplying a carrier gas into the film chamber volume is arranged in the area of the outer frame such that the carrier gas flowing in through the gas inlet flows through the film chamber volume from the outside inwards along the flexible wall portion to the vacuum port. This allows for a uniform flow through the film chamber volume in the area of the flexible wall portions. During the leak test, the film chamber volume is small and distributed along the surfaces of the flexible wall portions when the film chamber is evacuated.

"Central with respect to the frame and surrounded by the same on the outside" means that, in top plan view on the film chamber, such as e.g., in FIG. 1, the vacuum port is spaced approximately equally from the frame in all directions and the frame surrounds the vacuum port in an annular manner, without the frame having to be annular in shape. For example, the vacuum port may be located at or near the geometric center or the center of gravity of the frame when the film chamber is seen in top plan view.

According to a second variant of the invention, the vacuum port and the gas inlet are interchanged in the sense of a kinematic reversal, so that the gas inlet is arranged centrally with respect to the frame and is surrounded by the same on the outside, while at least one vacuum port is arranged such in the area of the outer frame that the carrier gas flowing in through the gas inlet flows through the film chamber volume from the inside to the outside along the flexible wall portion to the vacuum port or the vacuum ports.

The test fluid may be a test gas and/or a test liquid, i.e. also a mixture of a gas and a liquid.

According to the invention, it is advantageous if the carrier gas, after flowing into the film chamber through the gas inlet or before flowing out of the film chamber through the vacuum port, flows in the circumferential direction with a higher conductance value than in the radial direction to the vacuum port according to the conductance value in the radial direction. According to the first variant of the invention, after flowing into the film chamber, the gas can thus first spread in the circumferential direction on the outside along the outer edge of the film chamber walls, before the gas flows radially between the film chamber walls from the outside inwards towards the vacuum port. According to the second variant of the invention, before flowing out of the film chamber, the gas spreads in the circumferential direction on the outside along the outer edge of the film chamber walls after the gas flows radially between the film chamber walls from the inside outwards towards the vacuum port or the vacuum ports.

In both variants, a gas flow distributed evenly over the circumference is caused in the radial direction towards the vacuum port. To this end, in particular, the distance $d_2$ between the opposing inner frame surfaces adjacent to the film chamber volume can be greater than the distance $d_1$ between inner film surfaces in the evacuated state of the film chamber when no test specimen is contained, or in those regions in which the films are not spaced apart by a contained test specimen. Thereby, when the carrier gas flows in through the gas inlet, the gas is first distributed in the circumferential direction along the frame due to the greater distance $d_2$, before the gas flows radially between the film layers, which are drawn against each other, from the outside inwards in the direction towards the vacuum port.

In one embodiment of the invention, a plurality of gas inlets or vacuum ports are distributed along the circumference of the frame. In particular, the film chamber may be designed to be radially symmetrical, with the vacuum port being designed to be concentric with respect to the annularly circumferential frame. This enables a uniformly distributed carrier gas flow along the film surfaces in the radial direction from the outside to the inside through the film chamber.

With a film chamber having two film chamber walls placed against each other, each of the two walls may be provided with a vacuum port or a gas inlet arranged centrally and concentrically with respect to the frame.

At least on the side facing the film chamber volume, the flexible wall portion advantageously comprises or consists of a material that does not absorb test fluid and/or carrier gas. This material may be, for example, silicone, butyl rubber or EPDM (ethylene-propylene-diene-monomer) rubber.

On the inner sides of the film chamber walls or the flexible wall region, an additional layer of a material having a high gas conductivity because of its structure may be provided, e.g., as a thin net or mesh, in order to facilitate the flow of gas from the outer frame to the vacuum port or from the inner gas inlet to the outer frame between the walls drawn together. As an alternative or in addition, the surface of at least one of the walls or of the flexible wall portion, which faces the film chamber volume, may be structured, i.e., rough, uneven and/or provided with numerous protrusions and/or depressions, so that a finite gas conductance value is given.

The method according to the invention is defined by the features disclosed herein. According thereto, first, the test specimen is introduced into the film chamber and, thereafter, the film chamber is closed and evacuated with a vacuum pump connected to the vacuum port. A carrier gas is supplied through the gas inlet into the film chamber in the evacuated state with the film chamber volume reduced. In the case of a leaking test specimen, test fluid escapes from the inside of the test specimen into the film chamber where it mixes with the carrier gas. The resulting gas mixture of carrier gas and test fluid is drawn by the vacuum pump through the vacuum port and is supplied to a gas detector, which is also connected to the vacuum port, for analysis. The carrier gas is supplied to the vacuum port via the gas inlet from the outside to the inside (variant 1) or from the inside to the outside (variant 2) through the film chamber volume along the flexible wall portion, resulting in a homogeneously distributed carrier gas flow along the flexible wall portion.

In the following, exemplary embodiments of the invention are explained in more detail with reference to the Fig.s. In the drawings.

The film chamber 10 of the first two embodiments comprises an annular circumferential frame 12. In the third embodiment, the frame 12 is also annularly circumferential, while not being annular in shape, but almost rectangular with rounded corners. Other annular geometries of the frame 12 are conceivable.

Figure 2:
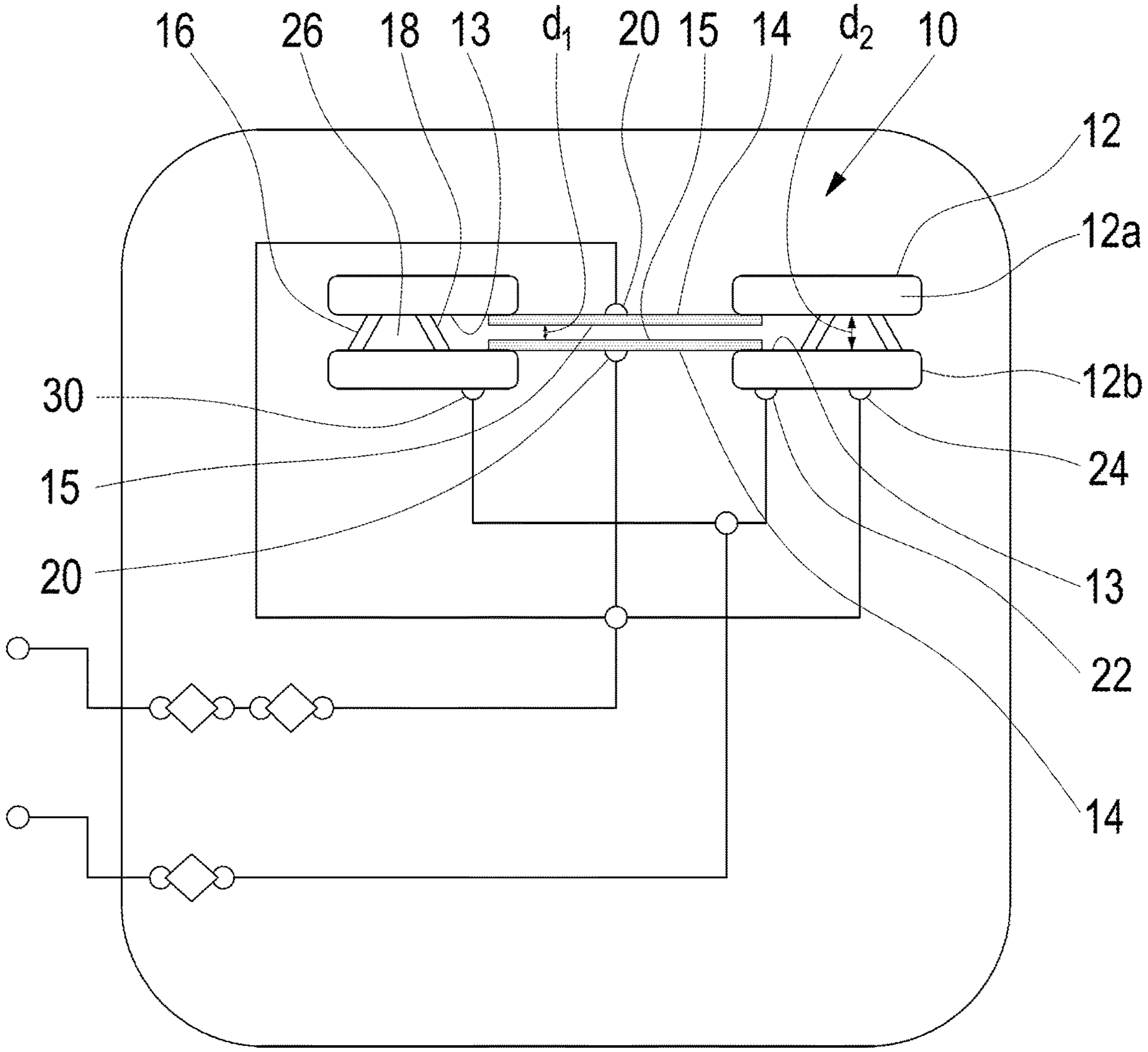
FIG. 2 is a schematic view of a second embodiment.

The frame 12 can be of a two-part design formed by two complementarily shaped frame parts, each frame part 12*a*, 12*b* supporting a respective film chamber wall 14. The two frame parts 12, 12*b* are each connected to one another in a gas-tight manner by means of two seals 16, 18 which are also shaped as circular rings, as illustrated in FIG. 2.

Figure 1:
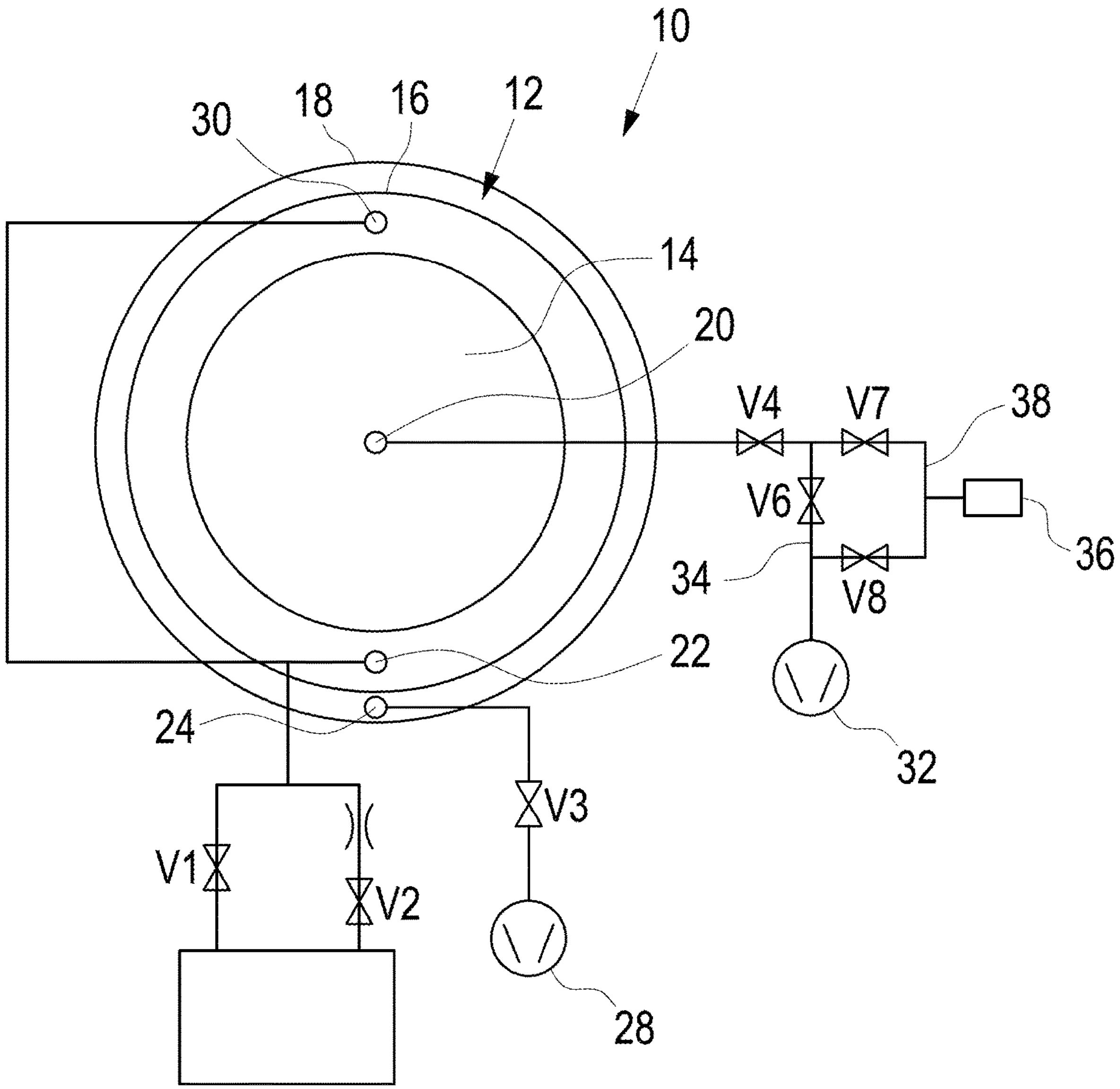
FIG. 1 is a schematic illustration of a first embodiment.
Figure 3:
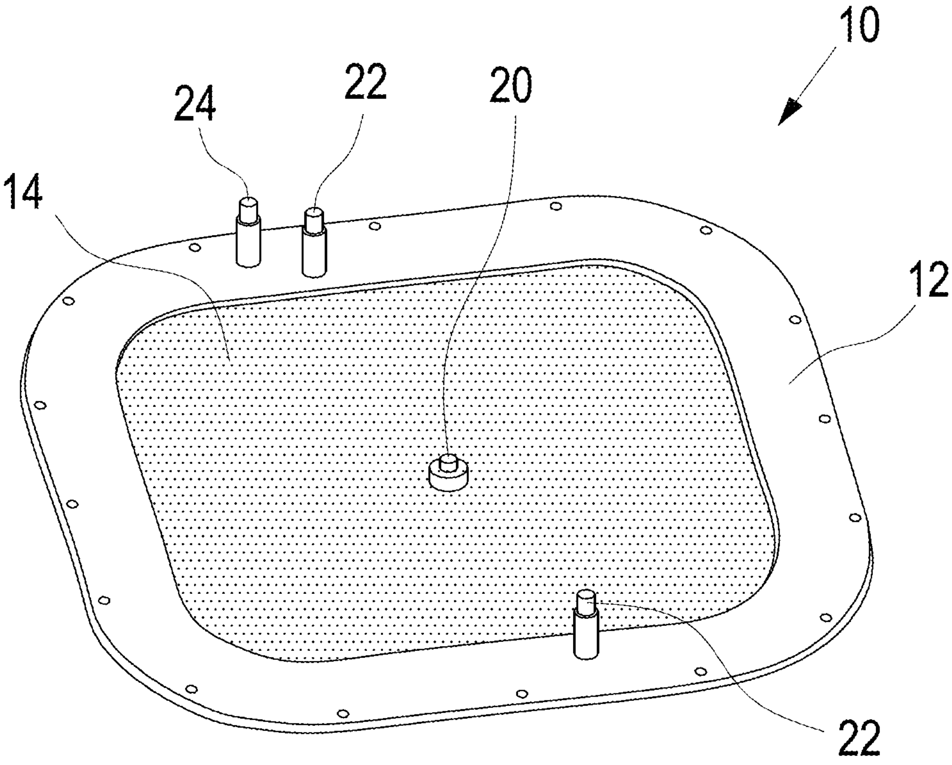
FIG. 3 is a perspective view of a third embodiment.

Each of the two films 14 is clamped in one of the two frame parts 12*a*, 12*b* and at least one of the films is provided with a vacuum port 20 arranged concentrically centered with respect to the circumferential frame 12. The frame 12 has a gas inlet 22 for the supply of carrier gas through the frame into the interior of the film chamber. In the embodiment of FIG. 1, a gas inlet 22, 30 is provided. In the embodiments of FIGS. 2 and 3, two gas inlets 22, 30 for the carrier gas are formed on opposing sides of the frame 12. In FIG. 1, a flushing gas source and a carrier gas source are connected to the gas inlet 22 via valves V1, V2. The frame further comprises another gas port 24. The gap 26 formed between the two seals 16, 18 can be evacuated via the gas port 24 by means of a vacuum pump 28 connected to the port 24. In the embodiment of FIG. 1, the vacuum pump 28 is connected to the gas port 24 via a valve V3.

The two frame parts 12*a*, 12*b* each have inner frame surfaces 13 on their sides adjacent to the film chamber volume and facing each other. The inner frame surfaces 13 of the two frame parts 12*a*, 12*b* are arranged at a distance $d_2$ from one another. This distance $d_2$ remains the same in the closed state of the frame and in the closed state of the film chamber and also in the evacuated state of the film chamber.

Both films 14 respectively comprise an inner film surface 15 on their side facing the film chamber volume. In the closed state of the film chamber, which is illustrated in FIG. 2, a distance $d_1$ remains between the two inner film surfaces 15 both in the evacuated state and the non-evacuated state. Only, when a test specimen is contained between the films 14 which is bounded by the films 14, the films 14 can yield and have a greater distance in the area of the test specimen. The distance $d_2$ is greater than the distance $d_1$, so that the carrier gas flowing into the film chamber volume through the gas inlets 22, 30 first spreads, in particular in the evacuated state of the vacuum pump, in the circumferential direction between the two frame parts 12*a*, 12*b* due to the greater distance $d_2$ before, due to the smaller distance $d_1$, it flows radially inwards from the outside from all radial directions towards the central vacuum ports 20. This results in a gas flow of the carrier gas from the outside to the inside, which is evenly distributed over the circumference.

As illustrated in FIG. 1, a vacuum pump 32 is connected to the vacuum port 20. In the embodiment of FIG. 1, the vacuum pump 32 is connected to the vacuum port 20 via a valves V4, V6. A gas detector 36 is connected to the gas conduction path 34 that connects the vacuum pump 32 to the vacuum port 20, by which detector the evacuated gas from the film chamber 10 can be analyzed for the presence of test fluid. Here, the gas detector 36 is connected to a detection gas conduction path 38 having two ends which are connected to the gas conduction path 34 via a valve V7, V8, respectively.

This allows the film chamber volume to be evacuated with the valves V4 and V6 open while the vacuum pump 32 is running, after the test specimen has been introduced. As soon as a sufficient vacuum is reached, the valve V5 can be closed, and the film chamber volume is supplied with a throttled, continuous carrier gas flow via the gas inlet 22 with the valve V2 open, which, in the flow chamber volume, flows radially from the outside to the inside along the inner side of the film chamber walls 14 in the direction towards the vacuum port 20. The valve V6 is closed and the valves V7 and V8 are opened, so that the gas mixture drawn from the film chamber volume is supplied to the gas detector 36 via the open valves V4 and V7 and eventually reaches the vacuum pump 32 via the open valve V8 and from there escapes into the ambient atmosphere.

After the leak test is completed, with the valve V2 closed and the valve V1 open, a flashing gas flow can be supplied to the film chamber volume via the gas inlet 22 to flush the same. Here, the flushing gas supply via the valve V1 is not or at least less strongly throttled than the carrier gas supply viy the opened valve V2.

With the valve V3 open and the vacuum pump 28 running, the gap of the frame, which is also referred to as the chamber ring gap, between the two seals 16, 18 can be evacuated to thereby press the two frame parts 12*a*, 12*b* against each other and to thus close the film chamber 12.

Advantageously, the carrier gas flow flows radially symmetrically from the outer chamber frame inwards through the space between the test chamber walls to the vacuum port in the centre of the wall or the film. This enables leakage gas escaping at one point of the test specimen to be detected with the same sensitivity and at the same rate (response time).

The uniformity of the gas flow is substantially influenced by the conductance value along the film space and the pressure difference between the inlet (at the respective transition from the chamber ring to the film space) and the vacuum port in the centre of the film.

To his end, the pressure in the chamber ring gap should be homogeneous. For this purpose, the gas conductance value in the circumferential direction along the chamber ring gap from the point of the carrier gas inlet 22 to the point in the chamber ring gap farthest away from the gas inlet 22 must be greater by at least a factor 10 that the gas conduction value in the radial direction along the space (film chamber volume) formed by the film chamber walls from the chamber ring gap to the centre of the respective film chamber wall.

The embodiments regarding the second variant of the invention correspond essentially to the ones illustrated in FIGS. 1-3, except for the difference that vacuum ports and gas inlets are interchanged.

The invention claimed is:

1. A film chamber for leak testing a test specimen containing a test fluid, wherein the film chamber comprises:

at least one vacuum port connectable to a vacuum pump and to a gas detector;

at least one flexible wall portion defining a film chamber volume; and a frame surrounding the flexible wall portion on the outside for closing the film chamber volume, wherein the frame is designed to extend annularly around the flexible wall portion and delimits the flexible wall portion, wherein:

the at least one vacuum port is arranged in an area located centrally with respect to the frame and surrounded radially on the outside by the frame;

at least one gas inlet for the supply of a carrier gas is arranged in the area of the outer frame such that the carrier gas flows through the gas inlet through the film chamber volume along the flexible wall portion radially from the outside inward to the vacuum port, or the at least one gas inlet for the supply of the carrier gas is arranged in an area located centrally with respect to the frame and surrounded radially on the outside by the frame, at least one vacuum port is arranged in the area of the outer frame such that the carrier gas flows through the gas inlet through the film chamber volume along the flexible wall portion radially from the inside outward to the vacuum port; and wherein the gas conductance value in the film chamber volume in the region of the frame is greater in the circumferential direction than the gas conductance value in the radial direction from the gas inlet to the vacuum port.

2. The film chamber according to claim 1, wherein the vacuum port or the gas inlet is arranged concentrically with respect to the frame.

3. The film chamber according to claim 1, wherein the walls of the film chamber are designed to be entirely flexible and are clamped in the frame.

4. The film chamber according to claim 1, wherein the gas inlet or the vacuum port is adjacent to the frame.

5. The film chamber according to claim 1, wherein the frame comprises a plurality of gas inlets or vacuum ports.

6. The film chamber according to claim 5, wherein the plurality gas inlets or vacuum ports are arranged distributed evenly along the circumference of the frame at regular distances from each other.

7. The film chamber according to claim 1, wherein two vacuum ports or gas inlets are formed on opposing sides of the film chamber volume.

8. The film chamber according to claim 1, wherein the frame has two opposing inner frame surfaces adjacent to the film chamber volume, and the two films have opposing inner film surfaces adjacent to the film chamber volume, the distance between the inner frame surfaces being greater than the distance between the inner film surfaces in the evacuated state of the film chamber when no test specimen is contained in the film chamber.

9. The film chamber according to claim 1, wherein the flexible wall portion comprises silicone, butyl rubber or EPDM.

10. A method for leak testing a test specimen containing a test fluid using a film chamber according to claim 1, the method comprising the steps of:

introducing the test specimen into the film chamber;

evacuating the film chamber by means of the vacuum pump connected to the vacuum port;

supplying the carrier gas to the film chamber via the gas inlet;

drawing a gas mixture, which is formed by the carrier gas and the test fluid escaping through a leak in the test specimen, through the vacuum port and supplying the drawn gas mixture to the gas detector;

analyzing the gas mixture for the presence of the test fluid using the gas detector;

wherein the carrier gas flows through the gas inlet through the film chamber volume along the flexible wall portion radially from the outside inward or from the inside outward to the vacuum port, wherein after flowing into the film chamber volume through the gas inlet or before flowing out of the film chamber volume through the vacuum port, the carrier gas flows with a greater gas conductance value in the circumferential direction than in the radial direction in the direction towards the vacuum port or the gas inlet.

* * * * *